T. R. TAYLOR.
Separators for Indian Corn.
No. 216,472. Patented June 10, 1879.
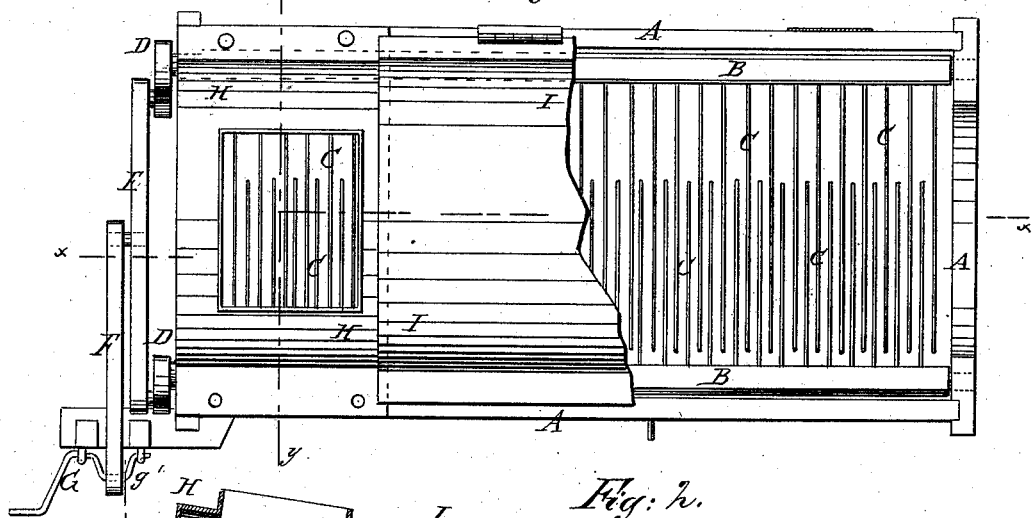
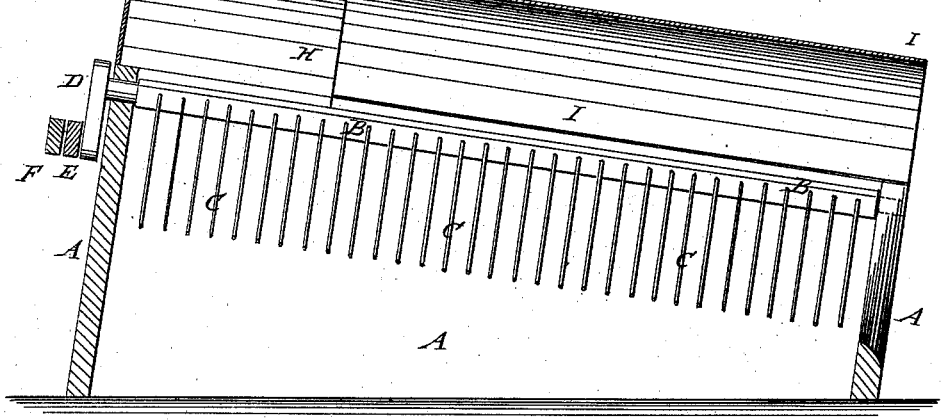
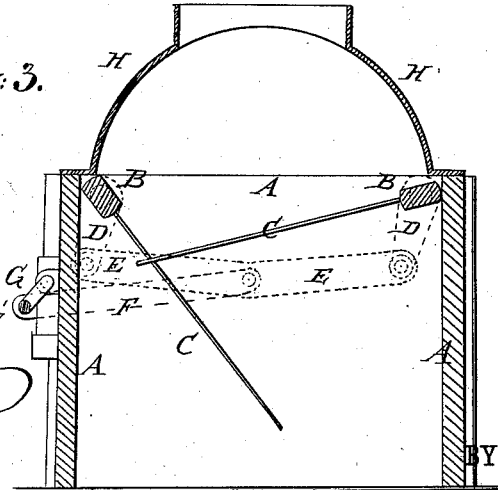
WITNESSES:
INVENTOR:
T. R. Taylor
BY
ATTORNEYS.

UNITED STATES PATENT OFFICE.

THOMAS R. TAYLOR, OF KANSAS CITY, MISSOURI.

IMPROVEMENT IN SEPARATORS FOR INDIAN CORN.

Specification forming part of Letters Patent No. 216,472, dated June 10, 1879; application filed November 30, 1878.

*To all whom it may concern:*

Be it known that I, THOMAS REDDING TAYLOR, of Kansas City, in the county of Jackson and State of Missouri, have invented a new and useful Improvement in Machines for Separating Corn from Cobs, of which the following is a specification.

Figure 1 is a top view of my improved machine, part of the cover being broken away to show the construction. Fig. 2 is a vertical longitudinal section of the same, taken through the line $x\ x$, Fig. 1. Fig. 3 is a vertical cross-section of the same, taken through the broken line $y\ y\ y$, Fig. 1.

Similar letters of reference indicate corresponding parts.

The object of this invention is to furnish an improved machine for separating corn from cobs, which shall be so constructed as to take out the small tips of cobs, and allow nothing to pass through with the kernels that the blast of a fan-blower cannot remove, and which shall be simple in construction, easily operated, and effective in operation, separating the corn rapidly and thoroughly.

The invention consists in the combination of the two shafts, provided with the alternating fingers, the cranks or crank-wheels, the connecting-bars, and the crank-shaft, with each other, and with the box or casing, substantially as herein shown and described.

A represents the casing or box of the machine, the forward end of which is made so much higher than the rear end as will give it the necessary inclination. B are two shafts that pass along the upper parts of the sides of the box A, and the ends of which are pivoted to the upper corners of the ends of the said box. To the shafts B are attached fingers C, of such a length that the fingers of the one shaft may reach to, or nearly to, the other shaft, and so arranged that the fingers of the one shaft may pass through the spaces between the fingers of the other shaft, as shown in Fig. 1.

The forward journals of the shafts B project, and to them are attached cranks or crank-wheels D, to which are pivoted the ends of a connecting-bar, E. To the middle part of the connecting-bar E is pivoted the end of a connecting-bar, F, the other end of which is pivoted to a crank, $g'$, formed upon or attached to a shaft, G, which revolves in bearings attached to the box A or to some other suitable support, and which may be operated by a crank or pulley and band from any convenient power.

The machine is covered with an arched cover, the forward part, H, of which is stationary, and has an opening formed through it to receive the corn. The rear part, I, of the cover is hinged at one edge, so that it can be turned back to give convenient access to the interior of the machine, when desired. The upper edge of the rear end of the box A is concaved, as shown in Figs. 1 and 2, to allow the cobs to escape.

A fan-blower is designed to be connected with the machine to blow or draw off the chaff and any small tips of cobs that may have passed through with the kernels.

With this construction when the machine is operated, the alternate up and down movement of the two sets of fingers C carries the cobs and the loose tips of cobs with a zigzag movement toward the rear end of the machine, where they pass out, while the kernels pass through the spaces between the said fingers. In this way the corn and cobs are separated very rapidly and very thoroughly. The crank-arms are to be provided with slot-holes, so that the length of stroke may be varied.

Having thus described my invention, I claim as new and desire to secure by Letters Patent—

The combination of the two shafts B, provided with the alternating fingers C, the cranks or crank-wheels D, the connecting-bars E F, and the crank-shaft G $g'$ with each other and with the box A, substantially as herein shown and described.

THOMAS REDDING TAYLOR.

Witnesses:
WILLIAM H. FEAMAN,
CLARA E. TAYLOR.